W. L. WEVER & A. W. JOHNSON.
Liquid Measures.

No. 145,377. Patented Dec. 9, 1873.

WITNESSES:

INVENTOR:

UNITED STATES PATENT OFFICE.

WILLIS L. WEVER AND A. WALLACE JOHNSON, OF PLATTSBURG, NEW YORK.

IMPROVEMENT IN LIQUID-MEASURES.

Specification forming part of Letters Patent No. 145,377, dated December 9, 1873; application filed October 11, 1873.

*To all whom it may concern:*

Figure 1:
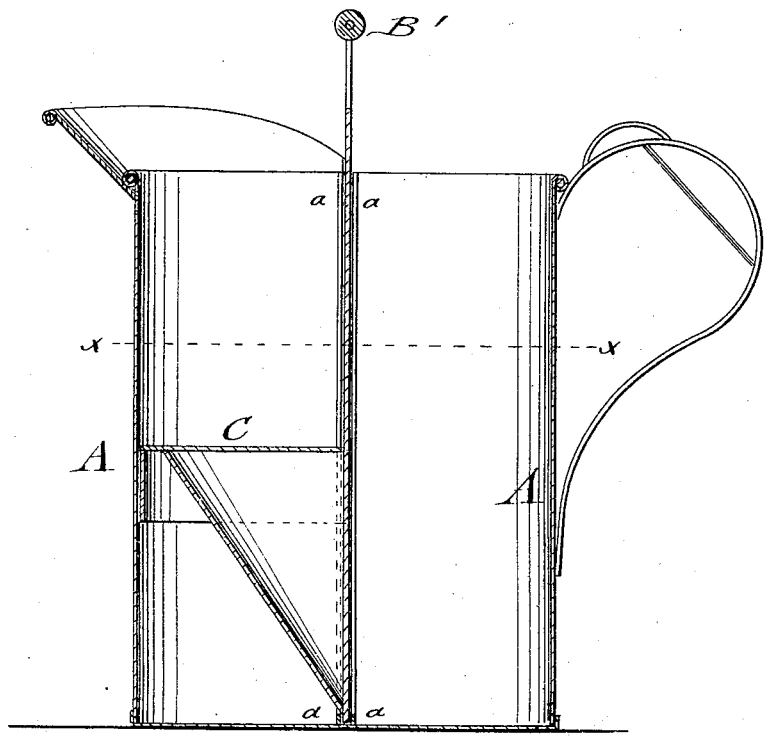
Figure 2:
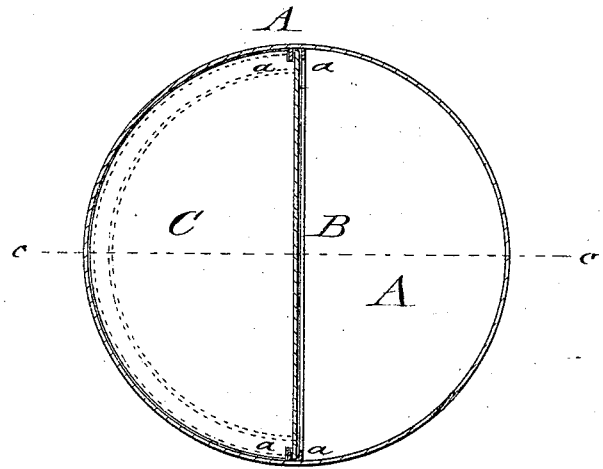

Be it known that we, WILLIS L. WEVER and A. WALLACE JOHNSON, of Plattsburg, in the county of Clinton and State of New York, have invented a new and Improved Measure, of which the following is a specification:

In the accompanying drawing, Figure 1 represents a vertical central section of our improved measure on the line $c\,c$, Fig. 2; and Fig. 2, a horizontal section of the same on the line $x\,x$, Fig. 1.

Similar letters of reference indicate corresponding parts.

The object of our invention is to furnish to store-keepers and others an improved measure for measuring molasses and other liquids, which can be used as a full measure or for any subdivisional part thereof, as may be required by the usages of the trade.

Our invention consists in arranging a measure of suitable size with a vertical central slide-gate, which is provided with a horizontal subdivisional shelf, so that, at pleasure, the whole half or other subdivisional measure may be filled.

A in the drawing represents any unit-measure, made of the usual material and of uniform cylindrical shape. The measure is divided accurately into two halves by a vertical gate, B, which slides in tightly-fitting guide-strips $a$, arranged at the sides and bottom, between the handles and lip or spout of the same. The gate B has a top handle, B′, and is provided centrally at the top and bottom of measure A with a horizontal shelf or division plate, $b$, which fits, with its semicircular circumference, closely to the sides of the measure. Thus a space is produced above shelf C, which is equal to one-fourth of the contents of the measure. Should it be desired, however, in some trades, to have other subdivisions than halves and fourths, a gate may be provided on which the shelf is placed at different heights, so as to produce one-sixth, eighth, or other parts of the full measure. An additional gate with shelves on either side may also be used for this purpose, so that, if a gallon-measure is used, half, quarter, and other fractional parts of a gallon may be measured by placing the gate in the required position, either with the shelf part from or toward the lip, and the desired measure be obtained without the use of extra vessels for the subdivisional measures required.

Having thus described our invention, we claim as new and desire to secure by Letters Patent—

A measure arranged for measuring the whole or any subdivisional part thereof, produced by the unit-measure A having sliding central gate B, with closely-fitting subdivisional shelf C, constructed and operated substantially as and for the purposes described.

WILLIS L. WEVER.
A. WALLACE JOHNSON.

Witnesses:
CHAS. H. RANSOM,
C. H. DANA.